(12) United States Patent
Minami (10) Patent No.: US 6,420,513 B2
(45) Date of Patent: Jul. 16, 2002

(54) ALIPHATIC POLYESTER, METHOD FOR MANUFACTURING ALIPHATIC POLYESTER, AND METHOD FOR RECYCLING CELLULOSE

(75) Inventor: Masato Minami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/770,313

(22) Filed: Jan. 29, 2001

(30) Foreign Application Priority Data

Jan. 31, 2000 (JP) ........................ 2000-022763
Sep. 12, 2000 (JP) ........................ 2000-276773

(51) Int. Cl.$^7$ .............................. C08C 19/20; C08H 5/04
(52) U.S. Cl. ...................... 528/354; 528/357; 524/765; 524/768; 524/779; 524/783; 527/103; 527/300
(58) Field of Search ................. 528/354, 357; 524/765, 768, 779, 783; 527/103, 300

(56) References Cited

U.S. PATENT DOCUMENTS

| 3,965,133 A | 6/1976 | Dahlberg et al. ........ 260/439 R |
| 4,156,066 A | 5/1979 | Gould ........................ 528/73 |
| 4,156,067 A | 5/1979 | Gould ........................ 528/73 |
| 6,156,429 A | 12/2000 | Marcincinova et al. ..... 428/402 |

FOREIGN PATENT DOCUMENTS

| DE | 28 27 450 | 1/1979 |
| DE | 0154 713 | 4/1982 |
| EP | 0 894 503 | 2/1999 |
| FR | 2 765 224 | 12/1998 |
| GB | 901037 | 7/1962 |
| JP | 5-213778 | 8/1993 |
| JP | 11-299479 | 11/1999 |
| WO | 97/40085 | 10/1997 |

OTHER PUBLICATIONS

H.S. Isbell et al., "The Oxidation of Alpha and Beta Glucose and a Study of the Isomeric Forms of Sugar in Solution," 10 *J. Res. Nat. Bur. Stand.* 337–356 (1933).

C.R. Nelson, "The Conformation of 2,3,4,6–tetra–O–acetyl–D–glucono–1,5–lactone," 106 *Carbohydrate Research* 155–159 (1982).

(List continued on next page.)

*Primary Examiner*—Samuel A. Acquah
(74) *Attorney, Agent, or Firm*—Fitzpatrick, Cella, Harper & Scinto (57) ABSTRACT

An aliphatic polyester is provided which is manufactured by a process comprising a step of hydrolyzing cellulose so as to form D-glucose, a step of forming gluconolactone represented by the formula (II) from the D-glucose, and a step of performing ring-opening polymerization of the gluconolactone so as to form an aliphatic polyester represented by the formula (I).

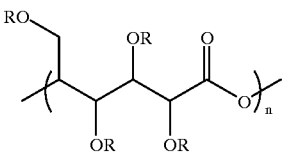

(I)

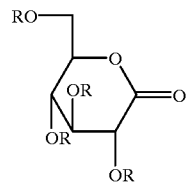

(II)

In the formulas above, R represents a hydrogen atom, an acetyl group, or a linear or a branched alkyl group having 1 to 3 carbon atoms, and the subscript n is an integer of 10 to 6,000.

29 Claims, 2 Drawing Sheets

OTHER PUBLICATIONS

E.S. West et al.,"2,3,4,6–tetramethyl–d–glucose," *Organic Synthesis Collective* 800–803 (1955).

R. Bihovsky et al., "Synthesis of C–Glucosides by Reactions of Glucosyl Halides with Organocuprates," 53 *J. Org. Chem.* 4026–4031 (1988).

J.S. Brimacombe et al., "Alkylation of Carbohydrates Using Sodium Hydride," 2 *Carbohydrate Research* 167–169 (1966).

M. Goebel et al., "A Facile Synthsis of Per–O–alkylated Glycono–δ–lactones From Per–O–alkylated Glycopyranocides and a Novel Ring Contraction for Pyranoses," 53(9) *Tetrahedron* 3123–3134 (1997).

ALIPHATIC POLYESTER, METHOD FOR MANUFACTURING ALIPHATIC POLYESTER, AND METHOD FOR RECYCLING CELLULOSE

BACKGROUND OF THE INVENTION

1. Field of the Invention

The present invention relates to aliphatic polyesters, to methods for manufacturing aliphatic polyesters, and to methods for recycling cellulose.

2. Description of the Related Art

Celluloses in an amount of $10^9$ to $10^{11}$ tons are produced annually and are widely used for structural materials, filling agents, food additives, adhesives, and the like. However, in recent years, concomitant with the larger use of celluloses, the amount of waste celluloses has also increased.

As techniques of decomposing celluloses for recycling, for example, a method for producing hydrocarbons, such as methane or ethane, from celluloses is disclosed in Japanese Unexamined Patent Application Publication No. 5-213778, and a method for producing alcohols from celluloses by using microbial action is disclosed in Japanese Unexamined Patent Application Publication No. 11-299479.

In view of recycling waste celluloses, through research on the techniques described above carried out by the inventor of the present invention, it was found that a novel technique must be developed which can efficiently recycle waste celluloses in order to overcome the problem of an increasing amount of waste cellulose year by year.

SUMMARY OF THE INVENTION

In consideration of the problem described above, by intensive research and development by the inventor, a novel method was found for synthesizing an aliphatic polyester, which had a relatively high molecular weight and thereby could be used instead of conventional plastic products, from gluconolactone which is obtained from cellulose via D-glucose, whereby the present invention was made. In addition, the novel method described above ensures efficient recycling of waste celluloses, and in other words, production of high quality plastics can be achieved by using celluloses as starting materials.

Accordingly, an object of the present invention is to provide a novel aliphatic polyester produced by using celluloses as a starting material and to provide a method for recycling celluloses.

Another object of the present invention is to provide an aliphatic polyester represented by the formula (I) shown below.

(I)

In the formula (I), R represents a hydrogen atom, an acetyl group, or a linear or a branched alkyl group having 1 to 3 carbon atoms. In addition, the subscript n represents an integer of 10 to 6,000.

Another object of the present invention is to provide a method for manufacturing an aliphatic polyester represented by the formula (I) shown below, comprising a step of performing ring-opening polymerization of gluconolactone represented by the formula (II) shown below.

(I)

In the formula (I), R represents a hydrogen atom, an acetyl group, or a linear or a branched alkyl group having 1 to 3 carbon atoms. In addition, the subscript n represents an integer of 10 to 6,000.

(II)

In the formula (II), R represents a hydrogen atom, an acetyl group, or a linear or a branched alkyl group having 1 to 3 carbon atoms.

Another object of the present invention is to provide a method for manufacturing an aliphatic polyester represented by the formula (I) shown below, comprising a step (i) of forming D-glucose by hydrolyzing cellulose, a step (ii) of forming gluconolactone represented by the formula (II) shown below from the D-glucose, and a step (iii) of performing ring-opening polymerization of the gluconolactone.

(I)

In the formula (I), R represents a hydrogen atom, an acetyl group, or a linear or a branched alkyl group having 1 to 3 carbon atoms. In addition, the subscript n represents an integer of 10 to 6,000.

(II)

In the formula (II), R represents a hydrogen atom, an acetyl group, or a linear or a branched alkyl group having 1 to 3 carbon atoms.

Another object of the present invention is to provide a method for recycling celluloses, comprising a step (i) of forming D-glucose by hydrolyzing cellulose, a step (ii) of forming gluconolactone represented by the formula (II) shown below from the D-glucose, and a step (iii) of performing ring-opening polymerization of the gluconolactone so as to form an aliphatic polyester represented by the formula (I) shown below.

(II)

In the formula (II), R represents a hydrogen atom, an acetyl group, or a linear or a branched alkyl group having 1 to 3 carbon atoms.

(I)

In the formula (I), R represents a hydrogen atom, an acetyl group, or a linear or a branched alkyl group having 1 to 3 carbon atoms. In addition, the subscript n represents an integer of 10 to 6,000.

In this connection, lactones are compounds having intermolecular cyclic ester structures, and some lactones are formed into aliphatic polyesters by open-ring polymerization. The aliphatic polyesters thus formed are used for various industrial applications, such as plastic molded products, films, hot-melt adhesives, and the like. As lactones to be used as starting materials for aliphatic polyesters, for example, ε-caprolactone, δ-valerolactone, and butyrolactone are known. However, an aliphatic polyester formed by open-ring polymerization of the gluconolactone represented by the formula (II) described above is the first polymeric compound synthesized by the inventor, and hence, the aliphatic polyester represented by the formula (I) is a novel polymeric compound.

According to the present invention, an aliphatic polyester having a high molecular weight can be manufactured by performing a ring-opening polymerization of gluconolactone formed from cellulose via D-glucose, and since the characteristics of mechanical strengths and the like are sufficiently superior, the aliphatic polyesters described above can be used as plastic molded products.

Further objects, features and advantages of the present invention will become apparent from the following description of the preferred embodiments with reference to the attached drawings.

DETAILED DESCRIPTION OF THE PREFERRED EMBODIMENTS

Next, the present invention will be described in detail with reference to the preferred embodiments.

That is, an embodiment of an aliphatic polyester according to the present invention is represented by the formula (I) shown below.

In addition, an aliphatic polyester of the present invention formed by using cellulose as a starting material has the structure represented by the formula (I).

(I)

In the formula (I), R represents a hydrogen atom, an acetyl group, or a linear or a branched alkyl group having 1 to 3 carbon atoms. As the alkyl group, for example, there may be mentioned a methyl group, an ethyl group, or a n-propyl group.

The subscript n representing a degree of polymerization is an integer of 10 to 6,000, and more preferably, of 100 to 3,000.

The aliphatic polyester of the present invention represented by the formula (I) above can be obtained by, for example, ring-opening polymerization of gluconolactone represented by the formula (II) shown below.

(II)

In the formula (II), R represents a hydrogen atom, an acetyl group, or a linear or a branched alkyl group having 1 to 3 carbon atoms.

In addition, the gluconolactone represented by the formula (II) above can be obtained from cellulose via D-glucose. When the glucose is formed from cellulose, commercially available celluloses are naturally used as a starting material, and in addition, waste celluloses may also be used that are obtained from appropriately treated waste paper, waste woods, and the like. Accordingly, by employing the method for synthesizing an aliphatic polyester from gluconolactone according to the present invention, a development of recycling waste celluloses, for example, may be further promoted.

That is, a method for manufacturing an aliphatic polyester of the present invention comprises a step (i) of hydrolyzing cellulose so as to form D-glucose, a step (ii) of forming the gluconolactone represented by the formula (II) above from the D-glucose, and a step (iii) of performing ring-opening polymerization of the gluconolactone so as to form the aliphatic polyester represented by the formula (I) above.

Hereinafter, the steps (i) to (iii) will be described.

The Step (i): from Cellulose to D-Glucose

As a method for forming D-glucose from cellulose, there may be mentioned, for example, a hydrolytic method using an enzyme such as a cellulase; a hydrolytic method using an acid, such as sulfuric acid, or hydrochloric acid; and a hydrolytic method using supercritical water.

The Step (ii): from D-Glucose to Gluconolactone

Gluconolactone (II)-a can be obtained by oxidizing D-glucose using bromine (H. S. Isbell, et al., "J. Res. Nat. Bur. Stand.", 10, pp. 337 to 356, 1933).

Gluconolactone (II)-b can be obtained by acetylating gluconolactone (II)-a using zinc chloride and acetic anhydride (C. L. Nelson, "Carbohydr. Res.", 106, pp. 155 to 159, 1982).

Gluconolactone (II)-c can be obtained by a process comprising a step of methylating D-glucose using dimethyl sulfate and sodium hydroxide, a step of hydrolyzing methyl glucoside thus formed by using dilute hydrochloric acid so as to form 2,3,4,6-tetra-O-methyl-D-glucose (E. S. West, et al., "Organic Syntheses Collect.", Vol. III, Wiley, New York, N.Y., pp. 800 to 803, 1955), and a step of oxidizing the D-glucose described above using pyridinium chlorochromate (R. Bihovsky, et al., "J. Org. Chem.", 53, pp. 4026 to 4031, 1988).

Gluconolactone (II)-d can be obtained by a process comprising a step of forming 2,3,4,6-tetra-O-ethyl-D-glucose from D-glucose (J. S. Brimacombe, et al., "Carbohydr. Res.", 2, pp. 167 to 169, 1966), and a step of oxidizing the D-glucose thus formed in methylene chloride using tin tetrachloride and trimethylsilyl azide (M. Goebel, et al., "Tetrahedron", 53(9), pp. 3123 to 3134, 1997).

(II)

In the gluconolactone (II)-a, R represents hydrogen atom (D-gluconic acid, δ-lactone); in the gluconolactone (II)-b, R represents CH$_3$CO (D-gluconic acid, δ-lactone, 2,3,4,6-tetraacetate); in the gluconolactone (II)-c, R represents CH$_3$ (D-gluconic acid, 2,3,4,6-tetra-O-methyl, δ-lactone); and in the gluconolactone (II)-d, R represents CH$_3$CH$_2$ (D-gluconic acid, 2,3,4,6-tetra-O-ethyl, δ-lactone).

The Step (iii): from Gluconolactone to Aliphatic Polyester; Ring-Opening Polymerization Polymerization Catalyst In the present invention, metal compounds mentioned below can be used as a polymerization catalyst for ring-opening polymerization of gluconolactone. In particular, they are tin-based compounds, such as monobutyltin oxide, dibutyltin oxide, tin tetraacetate, butyltin triacetate, dibutyltin diacetate, tributyltin acetate, phenyltin triacetate, dibutyldimethoxytin, tributylmethoxytin,butyltin tri(2-ethyl hexanoate), dibutyltin di(2-ethylehexanoate), dibutyltin dilaurate, tin dioctanoate, tin di(2,4-pentanedionate), tin dichloride, and tin tetrachloride; aluminum-based compounds, such as tri(isopropoxy)aluminum, di(isopropoxy)ethylaluminum, isopropoxydiethyl-aluminum, and aluminum chloride; zinc-based compounds, such as dibutoxyzinc, zinc di(2,2-dimethyl-3,5-heptanedionate), and zinc chloride; titanium-based compounds, such as tetrabutoxytitanate; zirconium-based compounds, such as tetrabutoxyzirconate; and organic rare earth compounds composed of lanthanum (La), neodymium (Nd), samarium (Sm), erbium (Er), thulium (Tm), ytterbium (Yb), lutetium (Lu), and the like.

The amount of the polymerization catalyst of the present invention is 0.01 to 10 wt % with respect to the total amount of gluconolactone and a polymerization initiator and is preferably 0.05 to 5 wt %.

Polymerization Initiator

In the present invention, alcohols mentioned below can be used as a polymerization initiator in ring-opening polymerization of gluconolactone. In particular, there may be mentioned monools, such as methanol, ethanol, 1-propanol, 2-propanol, various butanols, and phenol; diols, such as ethylene glycol, 1,3-propanediol, 1,4-butanediol, diethylene glycol, 1,5-pentanediol, 1,6-hexanediol, 1,7-heptanediol, 1,8-octanediol, and 1,10-decanediol; triols, such as glycerin, and trimethylol propane; and polyols, such as neopentyl glycol, and pentaerythritol. These polymerization initiators may be used alone or in combination.

The molar ratio of the polymerization initiator used in the present invention to the gluconolactone may be optionally selected in accordance with a desired degree of polymerization of the aliphatic polyester. In general, the molar ratio of the polymerization initiator to the gluconolactone is from 1 to 1 to 1 to 5,000 and is preferably from 1 to 1 to 1 to 2,000.

By adding the polymerization catalyst and the polymerization initiator to gluconolactone, ring-opening polymerization of the gluconolactone is performed in an inert gas atmosphere or in a reduced pressure atmosphere. The polymerization is preferably carried out at a normal pressure in a nitrogen atmosphere since it is easily performed.

The temperature for ring-opening polymerization of gluconolactone may be optionally determined. In general, the polymerization temperature is preferably in a range of 50 to 200° C. and is more preferably in a range of 100 to 180 ° C. When the temperature is less then 50° C., the reaction rate is decreased, or the reaction will not proceed. In contrast, when the temperature is more than 200° C., coloration or decomposition of an aliphatic polyester to be manufactured may occur due to an oxidation reaction. The time for ring-opening polymerization may also be optionally determined; however, it is preferable that the time be determined so as not to degrade the quality of an aliphatic polyester to be manufactured.

The ring-opening polymerization of gluconolactone can be performed in a solvent. The solvents used for this polymerization are inert solvents that do not react with the gluconolactone, the polymerication catalyst, and the polymerization initiator, and as a preferable solvent, there may be used an aromatic hydrocarbon, such as toluene or xylene, an aliphatic hydrocarbon, such as hexane, or a cycloaliphatic hydrocarbon, such cyclohexane. These solvents preferably contain substantially no water. The polymerization temperature is set to be from 0° C. to the boiling point or less of a solvent to be used.

Concerning the molecular weight of an aliphatic polyester obtained by ring-opening polymerization of gluconolactone, in the case in which the polymerization conditions are not changed, it is likely to obtain an aliphatic polyester having a higher molecular weight from gluconolactone in which the hydroxy groups are replaced. In particular, the weight average molecular weight of the aliphatic polyester is 3,000 to 2,000,000 as polystyrene, and more preferably, 10,000 to 1,400,000.

The aliphatic polyester thus formed according to the present invention can be used instead of plastic materials that are currently used in various industrial applications. In addition, by changing the weight average molecular weight and the functional groups bonded to the polyester, the aliphatic polyester can be widely applied in various industrial fields. For example, a polyester, having a weight average molecular weight of 3,000 to 5,000 produced by using a glycol as a polymerization initiator, can be effectively used as a starting material for polyurethanes, paints, or the like by exploiting the hydroxyl groups bonded to the polyester. In addition, an aliphatic polyester having a weight average molecular weight of 50,000 or more has practical mechanical strength, and hence, it can be used for plastic molded products, films, hot-melt adhesives, and the like.

EXAMPLES

Hereinafter, the present invention will be described in more detail with reference to the examples. However, the present invention is not limited to the examples described below.

Example 1

Cellulose (KC Flock W-100 manufactured by Nippon Paper Industries Co., Ltd.) in an amount of 500 parts by weight was added to 15,000 parts by weight of an enzyme solution and was stirred at 45° C. for 8 hours. The enzyme solution was prepared by dissolving 50 parts by weight of a cellulase (Meicelase TP60 manufactured by Meiji Seika K.K.) in 14,950 parts by weight of an aqueous solution (pH 4.5) of acetic acid and sodium acetate. After the reaction was complete, 1,000 parts by weight of methanol was added, a water-soluble residue was separated by filtration, and the mixed solution thus obtained was then passed through an ion-exchange resin column (Amberlite IR-120b manufactured by Organo Co., Ltd.) so as to remove the solvent. The mixture thus obtained was separated and purified, whereby 300 parts by weight of D-glucose was obtained. Nuclear magnetic resonance (NMR) was measured by using FT-NMR DPX 400 (manufactured by Bruker Inc.).

The measurement results are shown below.

Glucose: $^{13}$C-NMR (100 MHz, DMSO-$d_6$) δ/ppm

α type: 92.12, 73.04, 72.29, 71.80, 70.58, and 61.20

β type: 96.79, 76.70, 76.59, 74.78, 70.30, and 61.00

According to these measurement results, it was confirmed that desired D-glucose was obtained.

After 8,000 parts by weight of an aqueous solution of barium carbonate at a concentration of 12% was saturated with carbon dioxide, 330 parts by weight of bromine and 300 parts by weight of the D-glucose were added to the aqueous solution described above and were stirred at 25° C. for 30 minutes, whereby 250 parts by weight of gluconolactone represented by the formula (II)-a shown below was obtained.

(II)-a

The measurement results are shown below.
(II)-a: $^{13}$C-NMR (100 MHz, DMSO-$d_6$) δ/ppm
171.88, 81.23, 73.79, 71.43, 67.82, and 60.14

According to these measurement results, it was confirmed that desired gluconolactone was obtained.

In a nitrogen atmosphere, 100 parts by weight of the gluconolactone (II)-a was heated to 160° C., and 0.2 part by weight of monobutyltin oxide and 0.5 part by weight of diethylene glycol were then added to the gluconolactone (II)-a, whereby an aliphatic polyester was obtained. The polymerization time was 4 hours, and the weight average molecular weight of the aliphatic polyester thus obtained was 450,000.

Figure 1:
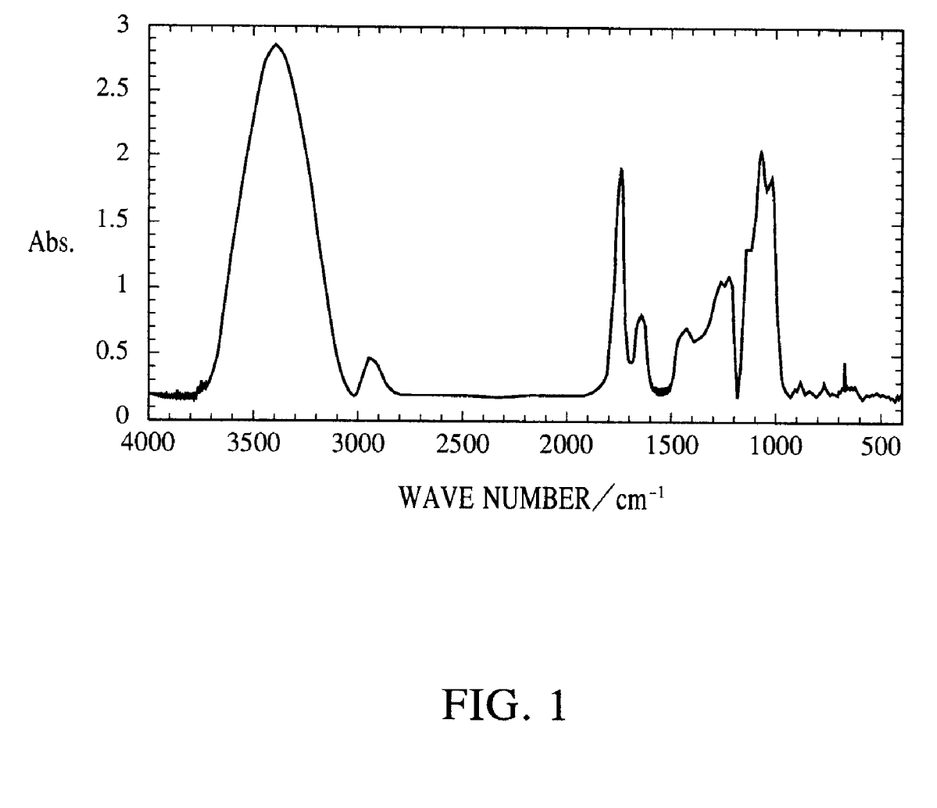
FIG. 1 shows an infrared absorption spectrum of an aliphatic polyester synthesized in Example 1 of the present invention.

For the aliphatic polyester described above, infrared absorption (IR) and NMR were measured. IR was measured by a KBr tablet method using FT-IR FTS 135 (manufactured by Bio-Rad Laboratories), and the results are shown in FIG. 1.

The results of NMR and IR are shown below.

ν (cm$^{-1}$): 3,460, 1,750, 1,230, 1,040, and 1,140 to 1,080

$^{13}$C-NMR (100 MHz, DMSO-$d_6$) δ/ppm 175.54, 81.27, 73.13, 72.62, 69.27, and 62.68

According to these measurement results, it was confirmed that a desired aliphatic polyester was synthesized.

Example 2

In a manner similar to that described in Example 1, 250 parts by weight of gluconolactone (II)-a was obtained from 500 parts by weight of cellulose. Zinc chloride in an amount of 125 parts by weight and acetic anhydride in an amount of 1,250 parts by weight were stirred with 250 parts if by weight of the gluconolactone (II)-a at room temperature for 40 minutes. The solution obtained by the reaction described above was poured into trash ice and was then extracted by using chloroform. After the solvent was removed, separation and purification of the mixture thus obtained were performed, whereby 460 parts by weight of gluconolactone represented by the formula (II)-b was obtained.

(II)-b

Ac=CH$_3$CO

The measurement results are shown below.
(II)-b: $^1$H-NMR (400 MHz, CDCl$_3$) δ/ppm
2.07 (s, 3H), 2.09 (s, 3H), 2.10 (s, 3H), 2.15 (s, 3H), 4.26 (dd, 1H), 4.40 (dd, 1H), 4.65 to 4.68 (m, 1H), 5.22 (d, 1H), 5.41 (t, 1H), and 5.57 (t, 1H)

According to these measurement results, it was confirmed that desired gluconolactone (II)-b was obtained.

In a nitrogen atmosphere, 100 parts by weight of the gluconolactone (II)-b was heated to 160° C. and was then mixed with 0.3 part by weight of tri(isopropoxy)aluminum and 0.6 part by weight of 1,4-butanediol, whereby an aliphatic polyester was obtained. The polymerization time was 4 hours, and the weight average molecular weight of the polyester thus obtained was 1,370,000.

Figure 2:
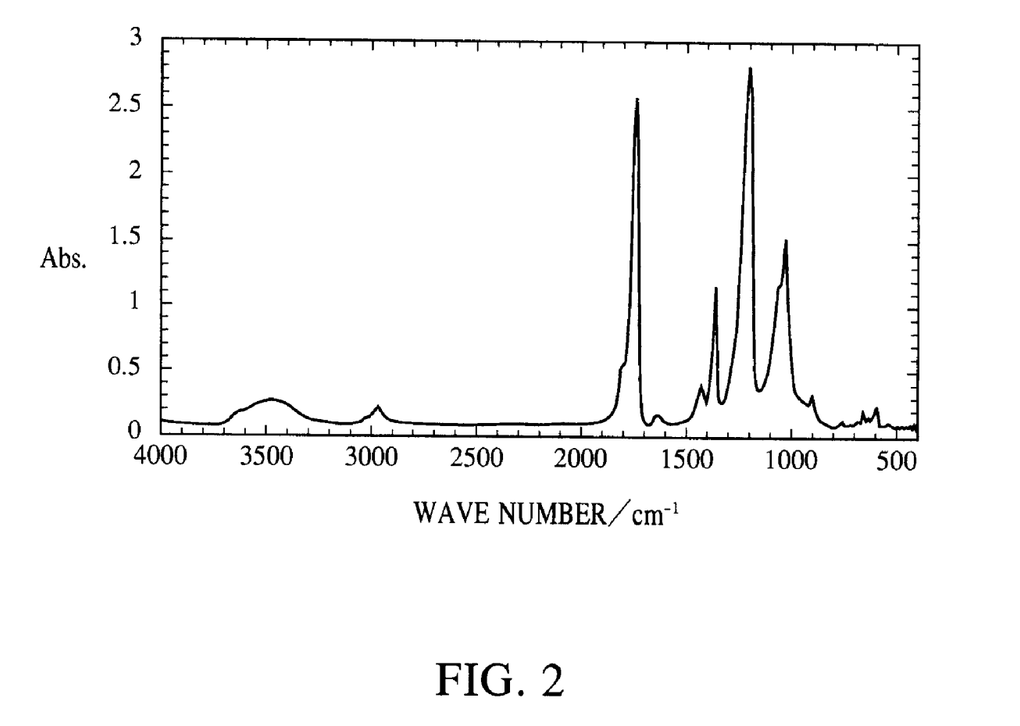
FIG. 2 shows an infrared absorption spectrum of an aliphatic polyester synthesized in Example 2 of the present invention.

IR and NMR were measured for the aliphatic polyester described above. The results of IR are shown in FIG. 2. In addition, the results of IR and NMR are shown below.

ν (cm$^{-1}$): 1,760, 1,430, 1,380, 1,230, and 1,040

$^{13}$C-NMR (100 MHz, CDCl$_3$) δ/ppm 171.51, 170.47, 169.97, 169.41, 169.14, 78.86, 74.22, 71.00, 67.63, 62.13, 20.51, 20.47, 20.26, and 20.21

According to these measurement results, it was confirmed that a desired aliphatic polyester was obtained.

Example 3

Used recycle PPC paper (EN-500, A4 size, sold by Canon Sales Co., Ltd), in which copying was performed on one side surface of the paper by a copying machine, was cut into pieces 5 mm by 5 mm, and 540 parts by weight of the pieces were added to 15,000 parts by weight of an enzyme solution and were then stirred at 45° C. for 10 hours. The enzyme solution was formed of 50 parts by weight of a cellulase (Meicelase TP60 manufactured by Meiji Seika K.K.) dissolved in 14,950 parts by weight of an aqueous solution (pH 4.5) of acetic acid and sodium acetate. After the reaction was complete, 1,000 parts by weight of methanol was added, a water-soluble residue was separated by filtration, and the mixed solution thus obtained was then passed through an ion-exchange resin column (Amberlite IR-120b manufactured by organo Co., Ltd.) so as to remove the solvent. The mixture thus obtained was separated and purified, whereby 300 parts The same results were obtained as those of Example 1 by $^{13}$C-NMR measurement, and it was confirmed that desired D-glucose was obtained.

The D-glucose in an amount of 300 parts by weight was added to 180 parts by weight of water and was then stirred at 55° C. To this solution thus prepared, 3,840 parts by weight of a carbon tetrachloride solution containing 1,440 parts by weight of dimethyl sulfate was added, and in addition, 6,960 parts by weight of an aqueous solution of sodium hydroxide at a concentration of 40% was added. Subsequently, the reaction temperature was increased to 70 to 75° C., and 2,500 parts by weight of dimethyl sulfate was added to the mixed solution described above and was then stirred for 30 minutes. The mixed solution thus obtained was diluted by a sufficient amount of water and was then extracted by using chloroform. After the chloroform was removed, 5,000 parts by weight of 2N hydrochloric acid was added to the mixed solution thus diluted and was then stirred at an elevated temperature for 1 hour. The solution thus prepared was extracted by using chloroform, and the solvent was then removed, thereby yielding a syrupy product. The syrupy product was washed by using an ether and was then crystallized. In addition, the crystallized product was washed again by using an ether, thereby yielding 220 parts by weight of 2,3,4,6-tetra-O-methyl-D-glucose. The measurement results are shown below.

$^{13}$C-NMR (100 MHz, CDCl$_3$) δ/ppm

α type: 58.87, 59.19, 60.45, 60.89, 69.95, 71.30, 79.50, 81.95, 83.12, and 90.73

β type: 58.87, 59.23, 60.52, 60.81, 71.58, 74.39, 79.62, 84.82, 86.38, and 97.14

According to these measurement results, it was confirmed that desired 2,3,4,6-tetra-O-methyl-D-glucose was obtained.

To 2,050 parts by weight of a dichloromethane solution containing 396 parts by weight of pyridinium chlorochromate, 1,870 parts by weight of a dichloromethane solution containing 220 parts by weight of the 2,3,4,6-tetra-O-methyl-D-glucose was added and was then refluxed for 8 hours. The mixed solution thus treated was diluted by using an ether and was filtrated by using magnesium silicate. After the solvent was removed, reduced-pressure distillation was performed, whereby 190 parts by weight of gluconolactone represented by the formula (II)-c was obtained.

(II)-c

The measurement results are shown below.

(II)-c: $^1$H-NMR (400 MHz, CDCl$_3$) δ/ppm 3.41 (s, 3H), 3.51 (s, 3H), 3.53 (s, 3H), 3.57 (s, 3H), 3.10 to 3.90 (m, 5H), and 4.50 (ddd, 1H)

According to these measurement results, it was confirmed that desired gluconolactone (II)-c was obtained.

In a nitrogen atmosphere, 100 parts by weight of the gluconolactone (II)-c was heated to 160° C., and 0.2 part by weight of dibutoxyzinc and 0.5 part by weight of methanol were added to the gluconolactone (II)-c, thereby yielding an aliphatic polyester. The polymerization time was 4 hours, and the weight average molecular weight of the polyester thus obtained was 780,000. The measurement results are shown below.

$^{13}$C-NMR (100 MHz, CDCl$_3$) δ/ppm 58.80, 59.13, 60.39, 60.85, 67.55, 76.18, 78.20, 78.84, 81.21, and 173.51

According to these measurement results, it was confirmed that a desired aliphatic polyester was obtained.

Example 4

In a manner similar to that described in Example 3, 300 parts by weight of D-glucose obtained from used paper was added to 1,100 parts by weight of a methanol solution containing hydrochloric acid at a concentration of 0.25 wt % and was then refluxed for 72 hours, whereby 160 parts by weight of methyl-D-glucopyranoside was obtained. The measurement results are shown below.

$^{13}$C-NMR (100 MHz, DMSO-d$_6$) δ/ppm 99.57, 73.33, 72.49, 71.90, 70.31, 60.54, and 54.22

According to these measurement results, it was confirmed that desired methyl-D-glucopyranoside was obtained.

A reaction was preformed at room temperature for 12 hours between 160 parts by weight of the methyl-D-glucopyranoside and 540 parts by weight of ethyl bromine in a mixture of 2,900 parts by weight of dimethyl sulfoxide and 290 parts by weight of an aqueous solution of sodium hydroxide at a concentration of 50%, whereby 197 parts by weight of 1-methyl-2,3,4,6-tetra-O-ethyl-D-glucopyranoside was obtained. The measurement results are shown below:

$^1$H-NMR (400 MHz, CDl$_3$) δ/PPM 1.15 to 1.24 (m, 12H), 3.38 (s, 3H), 3.24 to 3.88 (m, 14H), and 4.76 (d, 1H).

According to these measurement results, it was confirmed that desired 1-methyl-2,3,4,6-tetra-O-ethyl-D-glucopyranoside was obtained.

The 1-methyl-2,3,4,6-tetra-O-ethyl-D-glucopyranoside in an amount of 197 parts by weight and trimethylsilyl azide in an amount of 185 parts by weight were dissolved in 1,330 parts by weight of methylene chloride, and 640 parts by weight of a methylene chloride solution containing 400 parts by weight of tin tetrachloride was slowly dripped to the mixture of the 1-methyl-2,3,4,6-tetra-O-ethyl-D-glucopyranoside described above and was stirred at room temperature for 22 hours. After the reaction was complete, 1,800 parts by weight of water was added to the product thus obtained and was then extracted by using hexane. The mixture thus obtained was separated and purified by using column chromatography, whereby 150 parts by weight of gluconolactone represented by the formula (II)-d was obtained.

(II)-d

The measurement results are shown below.

(II)-d: $^1$H-NMR (400 MHz, CDCl$_3$) δ/ppm 1.16 to 1.33 (m, 12H), 3.45 to 3.89 (m, 12H), 3.93 (ABX$_3$-dq, 1H), and 4.32 (dt, 1H)

According to these measurement results, it was confirmed that desired gluconolactone (II)-d was obtained.

In a nitrogen atmosphere, 100 parts by weight of the gluconolactone (II)-d was heated to 160° C., and 0.4 part by weight of tetrabutoxytitanate and 0.6 part by weight of 1,8-octanediol were added to the gluconolactone (II)-d, whereby an aliphatic polyester was obtained. The polymerization time was 4 hours, and the weight average molecular weight of the aliphatic polyester thus formed was 1,060,000. The measurement results are shown below.

$^{13}$C-NMR (100 MHz, CDCl$_3$) δ/ppm 15.11, 15.28, 15.43, 15.56, 67.05, 67.18, 67.45, 67.72, 68.64, 76.20, 78.22, 78.87, 81.31, and 173.57

According to these measurement results, it was confirmed that a desired aliphatic polyester was obtained.

Evaluation of Properties

Various properties of the aliphatic polyesters obtained in Examples 1 to 4 were evaluated. The results are shown in Table 1. In addition, Celgreen (polycaprolactone-based plastic P-H7, manufactured by Daicel Chemical Industries, Ltd.) was also evaluated as a referential example for the sake of comparison.

As can be seen in Table 1, the individual polyesters obtained in Examples 1 to 4 had properties equivalent or superior than those of the polyester of the reference Example 1, i.e., the aliphatic polyester (P-H7) manufactured by Daicel Chemical Industries Ltd., having superior strength and elongation. Accordingly, it was understood that the polyester according to the present invention could be used instead of conventionally known plastic products.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An aliphatic polyester represented by the formula (I)

(I)

wherein R represents one of a hydrogen atom, an acetyl group, and a linear or branched alkyl group having 1 to 3 carbon atoms, and the subscript n represents an integer of 10 to 6,000.

2. A method for manufacturing an aliphatic polyester represented by the formula (I), comprising:

a step of performing ring-opening polymerization of gluconolactone represented by the formula (II);

(I)

TABLE 1

|  | EXAMPLE 1 | EXAMPLE 2 | EXAMPLE 3 | EXAMPLE 4 | REFERENCE EXAMPLE 1 |
|---|---|---|---|---|---|
| TENSILE YIELD STRENGTH (Pa) (JIS) K7113 | 0.22 | 0.26 | 0.25 | 0.27 | 0.20 |
| TENSILE MODULUS (Pa) (JIS) K7113 | 2.25 | 2.45 | 2.55 | 2.65 | 2.25 |
| FLEXURAL STRENGTH (Pa) (JIS) K7203 | 0.38 | 0.40 | 0.42 | 0.43 | 0.37 |
| FLEXURAL MODULUS (Pa) (JIS) K7203 | 5.10 | 5.29 | 5.59 | 5.68 | 4.41 |

-continued (II)

wherein, in the formula (I), R represents one of a hydrogen atom, an acetyl group, and a linear or branched alkyl group having 1 to 3 carbon atoms, and the subscript n represents an integer of 10 to 6,000, and in the formula (II), R represents one of a hydrogen atom, an acetyl group, and a linear or branched alkyl group having 1 to 3 carbon atoms.

3. A method for manufacturing an aliphatic polyester, according to claim 2, further comprising:
a step of hydrolyzing cellulose so as to form D-glucose; and
a step of forming gluconolactone represented by the formula (II) from the D-glucose;

(II)

wherein R represents one of a hydrogen atom, an acetyl group, and a linear or branched alkyl group having 1 to 3 carbon atoms.

4. A method for recycling cellulose, comprising:
a step of hydrolyzing the cellulose so as to form D-glucose;
a step of forming gluconolactone represented by the formula (II) from the D-glucose; and
a step of performing ring-opening polymerization of the gluconolactone so as to form an aliphatic polyester represented by the formula (I);

(II)

(I)

wherein, in the formula (II), R represents one of a hydrogen atom, an acetyl group, and a linear or branched alkyl group having 1 to 3 carbon atoms, and in the formula (I), R represents one of a hydrogen atom, an acetyl group, and a linear or branched alkyl group having 1 to 3 carbon atoms, and the subscript n represents an integer of 10 to 6,000.

5. An aliphatic polyester according to claim 1, wherein the subscript n represents an integer of 100 to 3,000.

6. An aliphatic polyester according to claim 1, wherein the weight average molecular weight of the aliphatic polyester is in a range of 3,000 to 2,000,000.

7. An aliphatic polyester according to claim 6, wherein the weight average molecular weight of the aliphatic polyester is in a range of 10,000 to 1,400,000.

8. A method for manufacturing an aliphatic polyester, according to claim 3, wherein the ring-opening polymerization uses a catalyst comprising a metal compound.

9. A method for manufacturing an aliphatic polyester, according to claim 8, wherein the metal compound is a tin compound.

10. A method for manufacturing an aliphatic polyester, according to claim 8, wherein the metal compound is an aluminum compound.

11. A method for manufacturing an aliphatic polyester, according to claim 8, wherein the metal compound is a zinc compound.

12. A method for manufacturing an aliphatic polyester, according to claim 8, wherein the metal compound is a titanium compound.

13. A method for manufacturing an aliphatic polyester, according to claim 8, wherein the metal compound is a zirconium compound.

14. A method for manufacturing an aliphatic polyester, according to claim 8, wherein the metal compound is an organic rare earth compound.

15. A method for manufacturing an aliphatic polyester, according to claim 8, wherein the ring-opening polymerization uses a polymerization initiator, and the amount of the catalyst is in a range of 0.01 to 10 wt % with respect to the total amount of the gluconolactone and the polymerization initiator.

16. A method for manufacturing an aliphatic polyester, according to claim 15, wherein the amount of the catalyst is in a range of 0.05 to 5 wt % with respect to the total amount of the gluconolactone and the polymerization initiator.

17. A method for manufacturing an aliphatic polyester, according to claim 3, wherein the ring-opening polymerization of the gluconolactone uses a polymerization initiator comprising an alcohol.

18. A method for manufacturing an aliphatic polyester, according to claim 17, wherein the alcohol is a monool.

19. A method for manufacturing an aliphatic polyester, according to claim 17, wherein the alcohol is a diol.

20. A method for manufacturing an aliphatic polyester, according to claim 17, wherein the alcohol is a triol.

21. A method for manufacturing an aliphatic polyester, according to claim 17, wherein the alcohol is a polyol.

22. A method for manufacturing an aliphatic polyester, according to claim 17, wherein the ratio of the polymerization initiator to the gluconolactone is in a range of from 1 to 1 to 1 to 5,000.

23. A method for manufacturing an aliphatic polyester, according to claim 22, wherein the ratio of the polymerization initiator to the gluconolactone is in a range of from 1 to 1 to 1 to 2,000.

24. A method for manufacturing an aliphatic polyester, according to claim 3, wherein the ring-opening polymerization is performed in one of an inert gas atmosphere and a reduced pressure atmosphere.

25. A method for manufacturing an aliphatic polyester, according to claim 3, wherein the ring-opening polymerization is performed in a temperature range of 50 to 200° C.

26. A method for manufacturing an aliphatic polyester, according to claim 25, wherein the ring-opening polymerization is performed in a temperature range of 100 to 180° C.

27. A method for manufacturing an aliphatic polyester, according to claim 3, wherein the ring-opening polymerization is performed in a solvent.

28. A method for manufacturing an aliphatic polyester, according to claim 27, wherein the solvent comprises an aromatic hydrocarbon.

29. A method for manufacturing an aliphatic polyester, according to claim 27, wherein the solvent comprises one of an aliphatic hydrocarbon and a cycloaliphatic hydrocarbon.

* * * * *

UNITED STATES PATENT AND TRADEMARK OFFICE
CERTIFICATE OF CORRECTION

PATENT NO.   : 6,420,513 B2
DATED        : July 16, 2002
INVENTOR(S)  : Masato Minami It is certified that error appears in the above-identified patent and that said Letters Patent is hereby corrected as shown below:

Column 3,
Line 53, "as" should read -- for --.

Column 6,
Line 54, "such" should read -- such as --.

Column 8,
Line 30, "if" should be deleted; and
Line 33, "trash" should be deleted.

Column 9,
Line 66, "filtrated" should read -- filtered --.

Signed and Sealed this

Eleventh Day of March, 2003

JAMES E. ROGAN
*Director of the United States Patent and Trademark Office*